ary, desired mixtures of isotopic gas can be used as a
filter to photodissociate enriched preselected isotopes
of oxygen.

United States Patent [19]
Rockwood et al.

[11] 4,437,958
[45] Mar. 20, 1984

[54] DEVICE AND METHOD FOR SEPARATING OXYGEN ISOTOPES

[75] Inventors: Stephen D. Rockwood; Robert K. Sander, both of Los Alamos, N. Mex.

[73] Assignee: The United States of America as represented by the United States Department of Energy, Washington, D.C.

[21] Appl. No.: 868,586

[22] Filed: Jan. 11, 1978

[51] Int. Cl.³ .............................................. B01J 19/12
[52] U.S. Cl. .............................. 204/157.1 R; 422/186
[58] Field of Search ................. 204/157.1 R; 250/527; 422/186

[56] References Cited

U.S. PATENT DOCUMENTS 4,029,558 6/1977 Morling ........................... 204/158 R
4,082,633 4/1978 Eerkens ......................... 204/157.1 R

OTHER PUBLICATIONS

"The Tac II krF Laser: A Preliminary Report", Barker et al., a Los Alamos unclassified report LA-UR-76-1758.

Applied Physics Letters, vol. 29, No. 11, Dec. 1, 1976, Burnham et al., pp. 707-709.
Chemical Abstract, vol. 71(1969), 86862h.
JETP Letters (USA), vol. 17, No. 2(Jan. 20, 1973), pp. 63-65.

Primary Examiner—Howard S. Williams
Attorney, Agent, or Firm—Samuel M. Freund; Paul D. Gaetjens; Richard G. Besha

[57] ABSTRACT

A device and method for separating oxygen isotopes with an ArF laser which produces coherent radiation at approximately 193 nm. The output of the ArF laser is filtered in natural air and applied to an irradiation cell where it preferentially photodissociates molecules of oxygen gas containing $^{17}O$ or $^{18}O$ oxygen nuclides. A scavenger such as $O_2$, CO or ethylene is used to collect the preferentially dissociated oxygen atoms and recycled to produce isotopically enriched molecular oxygen gas. Other embodiments utilize an ArF laser which is narrowly tuned with a prism or diffraction grating to preferentially photodissociate desired isotopes. Similarly, desired mixtures of isotopic gas can be used as a filter to photodissociate enriched preselected isotopes of oxygen.

17 Claims, 6 Drawing Figures

DEVICE AND METHOD FOR SEPARATING OXYGEN ISOTOPES

This invention is the result of a contract with the Department of Energy (Contract No. W-7405-ENG-36).

BACKGROUND OF THE INVENTION

The present invention pertains generally to isotope separation and more particularly to laser induced isotope separation of molecular gases.

The conventional method of separating oxygen isotopes comprises a series of distillation steps which are both costly and time consuming. Additionally, the purity obtained by such methods, although adequate for most desired uses, is somewhat low. With the advent of ultraviolet gaseous lasers, unprecedented amounts of energy have been obtained and utilized to preferentially photodissociate isotopes of various molecular gases.

SUMMARY OF THE INVENTION

The present invention overcomes the disadvantages and limitations of the prior art by providing a device and method for laser isotope separation of oxygen. The present invention utilizes coherent laser radiation at approximately 193 nm which is filtered to preferentially photodissociate molecules of oxygen gas containing preselected oxygen nuclides. Atomic oxygen, generated from the dissociated molecules, is collected by scavengers such as $O_2$, CO, ethylene, etc. Isotopically enriched oxygen gas is subsequentially generated from these oxygen atoms in a recycling step.

It is therefore an object of the present invention to provide a device and method for laser isotope separation of oxygen.

It is also an object of the present invention to provide a device and method for isotope separation of oxygen which is simple and inexpensive to implement.

Another object of the present invention is to provide isotopically enriched oxygen gas from preselected oxygen nuclides.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from the detailed description. The foregoing Abstract of the Disclosure is for the purpose of providing a nonlegal brief statement to serve as a searching and scanning tool for scientists, engineers and researchers and is not intended to limit the scope of the invention, as disclosed herein, nor is it intended to be used in interpreting, or in any way limiting the scope or fair meaning of the appended claims.

DETAILED DESCRIPTION OF THE PREFERRED EMBODIMENT OF THE INVENTION

Figure 1:
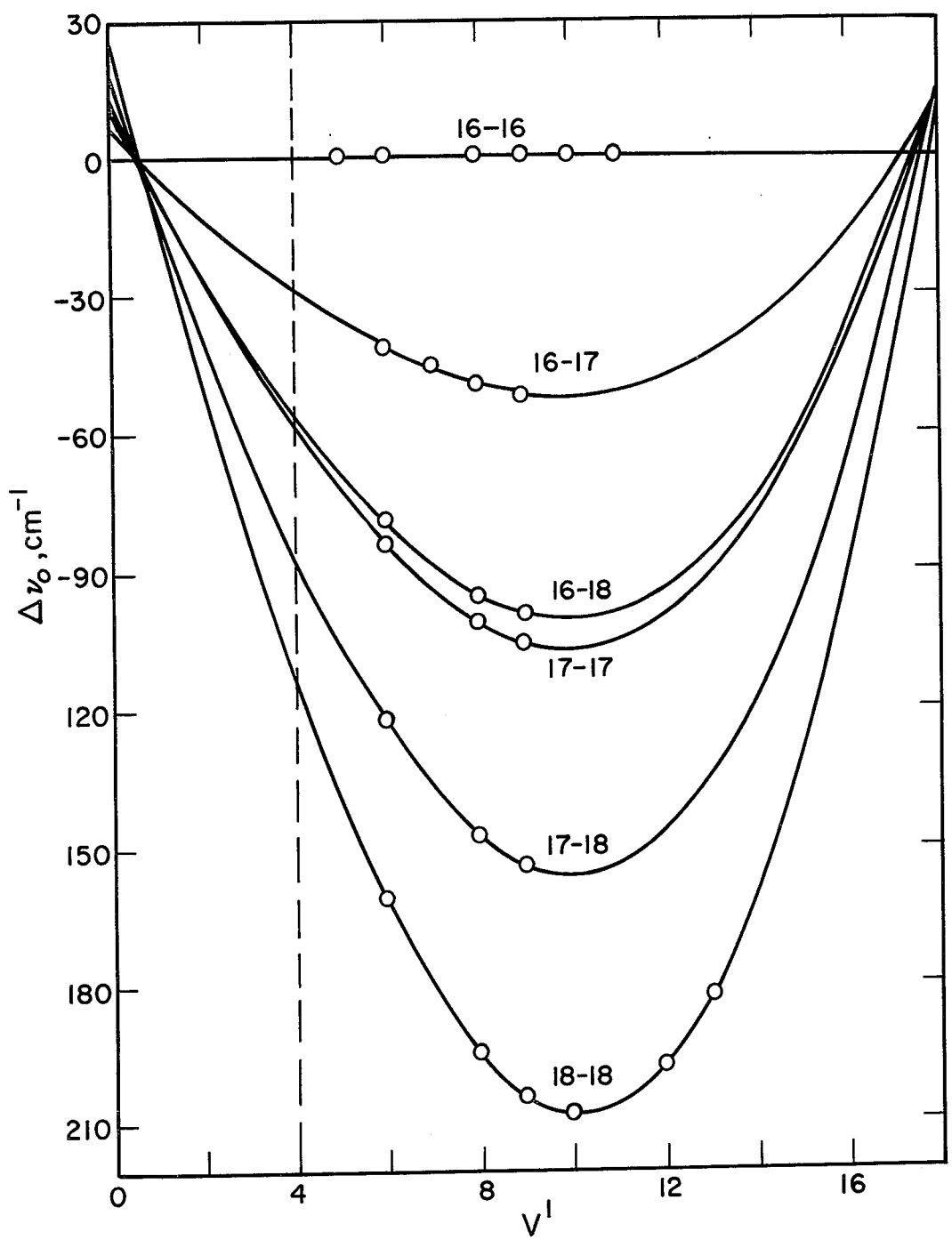
FIG. 1 is a graph of the Schumann-Runge v'-O band origins of molecular oxygen gas illustrating energy shifts of various isotopes at a series of vibrational levels relative to the position of $^{16}O_2$ levels.

FIG. 1 is a graph of various vibrational levels of molecular $O_2$ gas compared with shifts in energy levels of various oxygen isotopes from the $^{16}O^{16}O$ molecule. As is clear from FIG. 1, isotope shifts of the $O_2$ states are large. More specifically, at the appropriate value of $v'=4$, band origin shifts for the isotopes of interest, i.e., $^{16}O^{17}O$, $^{16}O^{18}O$, $^{17}O^{17}O$, $^{17}O^{18}O$, $^{18}O^{18}O$, range from 30 to 110 cm$^{-1}$ (0.11–0.41 nm).

Figure 2:
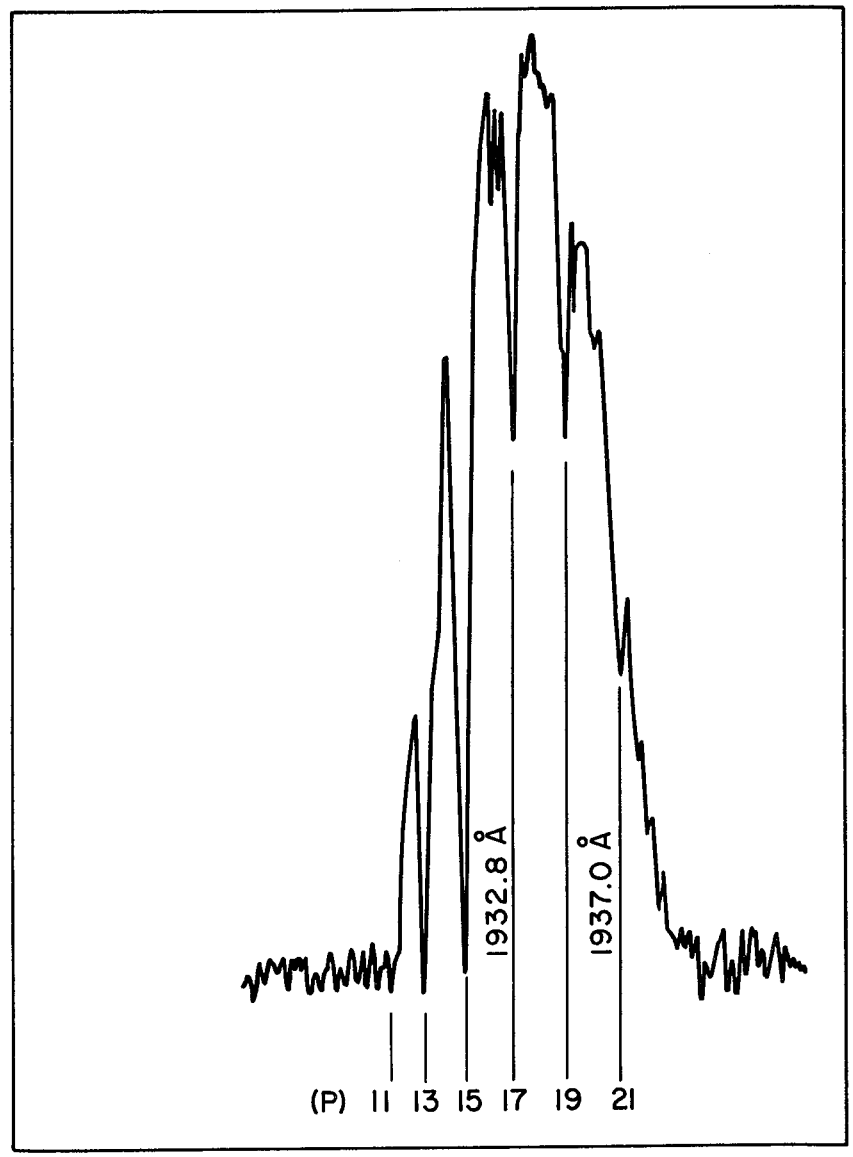
FIG. 2 is a graph of the lasing spectrum of an ArF laser with ambient air in the optical cavity, illustrating the strong $^{16}O_2$ absorptions from the 4-O Schumann-Runge band.

Referring to FIG. 2, since the ArF lasing transition goes to an unbound ground state, the lasing line produced is approximately 1 nm in bandwidth. As graphically shown in FIG. 2, portions of the lasing output are strongly absorbed by the $^{16}O_2$ Schumann-Runge $B^3\Sigma u^- - X^3\Sigma g^-$ bands in ambient air, specifically rotational states of the 4-O vibrational band. The rotational states are identified in FIG. 2 by P values, although the absorption lines indicate averages of close P and R lines. Since the rotational states are known to be predissociative, the absorption line widths are sufficiently small, i.e., approximately 1 cm$^{-1}$, in comparison to the band origin shifts illustrated in FIG. 1, to achieve the desired isotopically selective photodissociation.

Figure 3:
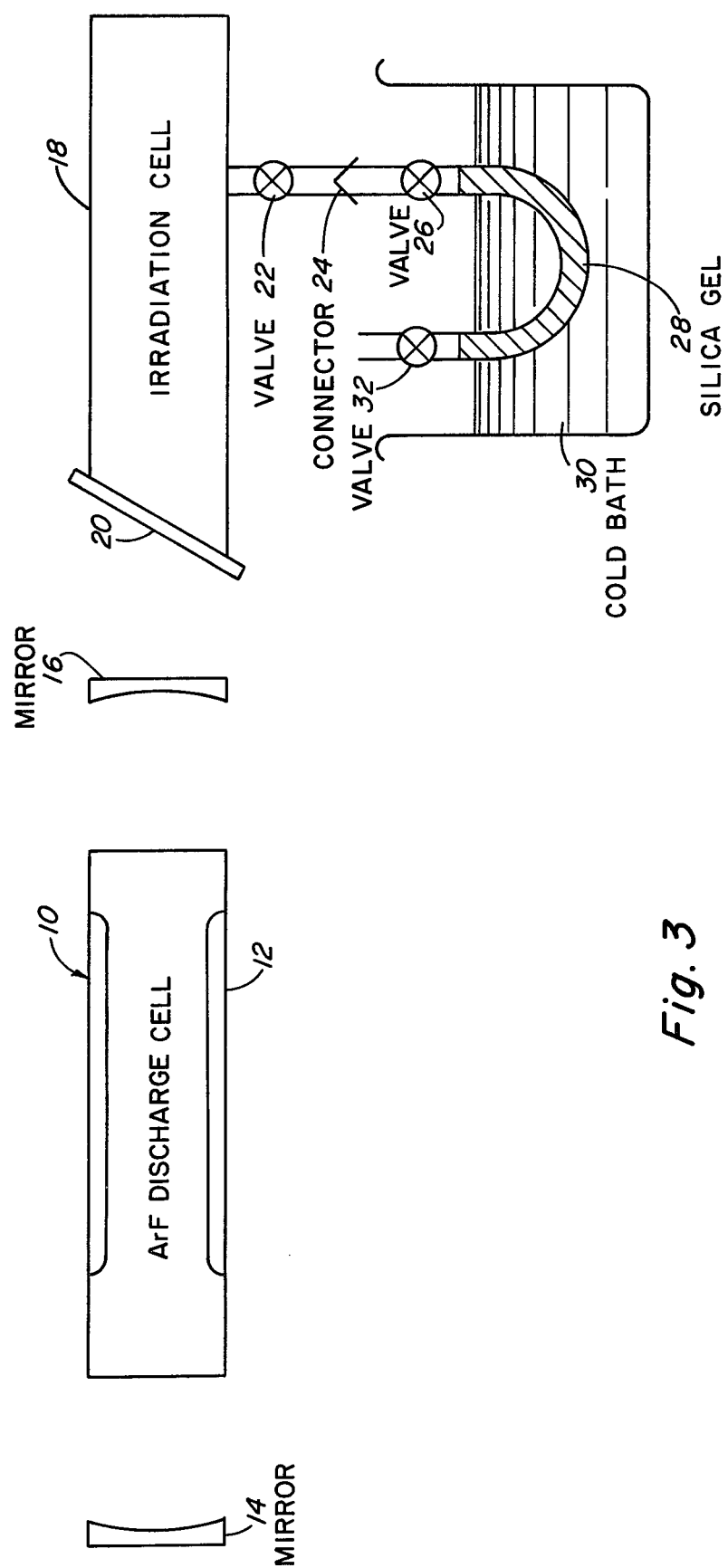
FIG. 3 is a schematic illustration of the device of the preferred embodiment of the invention utilizing ambient air as a filter.

A schematic diagram of the experimental device is shown in FIG. 3. A double discharge ArF laser 10, comprising ArF discharge cell 12 and mirrors 14 and 16, an example of which, is disclosed in Appl. Phys. Lett. 29, 707 (1976), is capable of producing approximately 50 mJ pulses at 1 Hz. The external mirrors 14 and 16 cause the double discharge laser 10 to lase within an optical cavity which includes approximately 30 cm of free air path. Due to the high concentration in ambient air of $^{16}O^{16}O$ molecular gas, the 30 cm free air path of laser 10 results in the absorption spectrum illustrated in FIG. 2. As shown in FIG. 3, this output is propagated without focusing into irradiation cell 18 containing nominal purity oxygen, resulting in an average deposition of approximately 10 mJ per pulse in the cell for pulse lengths of approximately 25 ns. Since the ambient air has acted as a filter to remove radiation coincident with the $^{16}O_2$ absorption lines, the radiation generated by laser 10 preferentially photodissociates $O_2^*$ molecules, where $O_2^*$ represents $^{16}O^{17}O$, $^{16}O^{18}O$, $^{17}O^{18}O$, $^{17}O^{17}O$, or $^{18}O^{18}O$, and $O^*$ represents $^{17}O$ or $^{18}O$. Preferential dissociation most often results in:

due to the higher concentrations of $^{16}O^{17}O$ and $^{16}O^{18}O$ although,

occurs when $^{17}O^{18}O$, $^{17}O^{17}O$ and $^{18}O^{18}O$ are preferentially dissociated.

The rare oxygen nuclides $O^*$, generated by preferential dissociation, react with oxygen molecules within the irradiation cell 18 in the following manner:

$$O^* + O_2 + M \xrightarrow{(k_1)} O_3^* + M \tag{3}$$

where M is a medium for energy absorption to prevent breakup of the ozone molecule. Any number of molecular gases could be used for this purpose including nitrogen gas, helium gas, or, as in the present case, molecular oxygen gas. In this manner, ozone is generated containing a rare oxygen nuclide.

In experiments performed, two different stainless steel irradiation cells 18 were used which were 0.3 and 1.0 m long respectively. Both cells had 2 cm diameter $BaF_2$ entrance windows and were filled with 10 atm of commercial oxygen having nominal 99.6% purity. These gas fills were irradiated with 50–600 shots from the laser and then bled via valves 22 and 26 into a silica gel trap 28 which was cooled with a dry ice cold bath 30. Valves 22 and 26 were then closed and the trap removed by connector 24. The trap was then pumped down via valve 32 to approximately $10^{-5}$ torr to remove the oxygen gas from the ozone trapped in the silica gel 28. The trap was then attached to a quadrupole mass spectrometer and the cold bath 30 removed so that the ozone was released from the silica gel 28. The mass spectrometer was repetitively scanned through the $O_2^+$ m/e peaks 32, 33, and 34. The background noise in the mass spectrum was approximately an order of magnitude smaller than the smallest peak observed.

To calibrate the natural isotope ratio, $O_2$ from the oxygen cylinder which was used in the separation experiment, was converted to ozone in a corona discharge and trapped in the same silica gel system. The results of the calibration run and runs for the 0.3 m and 1 m cells are shown in the following table:

| Cell Length | Shots | 33/32 | 34/32 | Enrichment $^{17}O$ | $^{18}O$ |
|---|---|---|---|---|---|
| (Calibration run) | | $(1.03 \pm 0.01) \times 10^{-3}$ | $(4.10 \pm 0.01) \times 10^{-3}$ | — | — |
| 0.3 m | 500 | $(2.80 \pm 0.04) \times 10^{-3}$ | $(7.85 \pm 0.02) \times 10^{-3}$ | 70% | 90% |
| 1 m | 600 | $(1.10 \pm 0.02) \times 10^{-3}$ | $(4.35 \pm 0.01) \times 10^{-3}$ | 7% | 6% |

Following the photodecomposition, reaction (3) has to compete with the two-body reaction, $$O^* + {}^{16}O_2 \xrightarrow{(k_2)} {}^{16}O^*O + {}^{16}O \tag{4}$$

which scrambles the isotopic selectivity in the subsequent formation of $^{16}O_3^*$. In spite of the pressure enhancement of the three-body reaction (3), at the pressure used the ratio $k_2/k_1$ is 4, indicating that the scrambling of reaction (4) seriously degrades achievable enrichments.

However, the scrambling of reaction (4) and other scrambling reactions such as $$O_3^* + O_2 \xrightarrow{(k_3)} O_3 + O_2^* \tag{5}$$

are significantly reduced through the use of a scavenger within the irradiation cell 18 such as carbon monoxide, ethylene or any other suitable scavenger which has a very slow scrambling reaction rate and does not have absorption lines near 193 nm. With carbon monoxide as a scavenger, carbon dioxide is generated within the irradiation cell 18 in the following manner:

$$O_2^* + h\nu \rightarrow O^* + O \tag{6}$$

$$CO + O^* \rightarrow CO_2^* \tag{7}$$

In the case where ethylene is used as a scavenger, the following reaction occurs:

$$O^* + h\nu \longrightarrow O^* + O \tag{8}$$

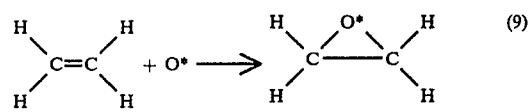
(9)

The rate of scrambling reactions using CO or ethylene as scavengers is greatly reduced so that much higher enrichments are possible.

In addition, use of scavengers such as carbon monoxide and ethylene rather than $O_2$ eliminates other problems encountered with ozone such as its appreciable cross section for photodissociation by 193 nm photons. This problem is apparent from the above table where a greater number of shots, among other things, clearly decreases the enrichment obtained. Neither $CO_2$ nor ethylene have a cross section for photodissociation in 193 nm wavelength radiation so that additional shots do not degrade enrichment insofar as the photodissociation of CO or ethylene is concerned.

In order to regenerate enriched oxygen gas, a recycle step must be employed for generating the enriched oxygen gas from the scavenger. A typical recycle step for obtaining enriched oxygen gas from enriched carbon dioxide is burning magnesium in the generated carbon dioxide as follows:

$$CO_2^* + Mg \xrightarrow{(hot)} CO + MgO^* \; (50\%) \tag{10}$$

$$MgO^* + HCl \longrightarrow MgCl_2 + H_2O^* \tag{11}$$

$$H_2O^* \text{ electrolysis} \longrightarrow H_2 + O_2^* \tag{12}$$

Similarly, the following reaction could be employed to generate oxygen from ethylene oxide.

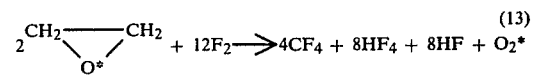
(13)

Figure 4:
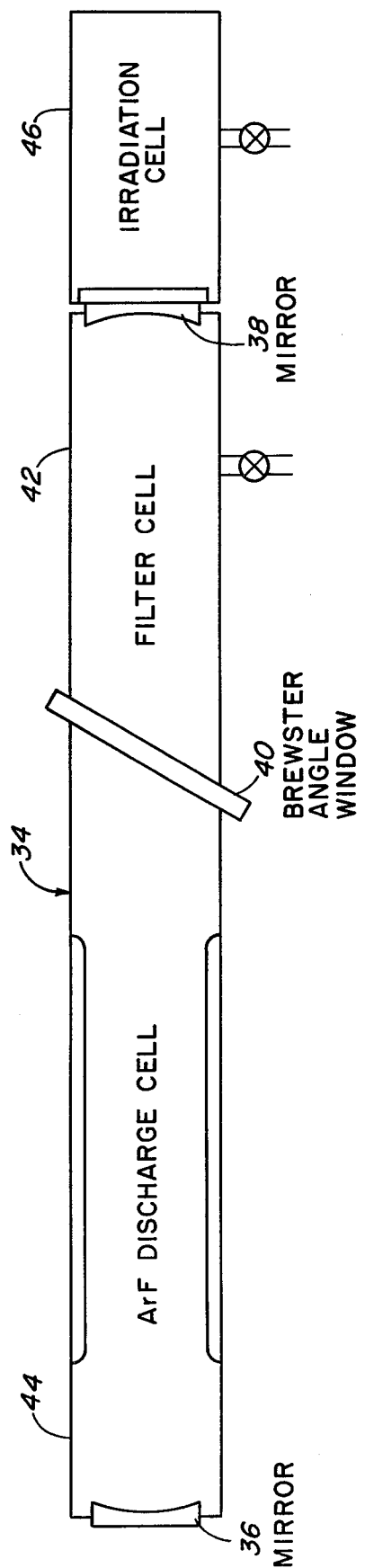
FIG. 4 is a schematic illustration of the preferred embodiment of the invention utilizing a separate $O_2$ gas filter cell.

FIG. 4 discloses the preferred embodiment wherein a distinct intracavity filter cell is utilized within ArF laser 34. The lasing cavity of ArF laser 34 is formed between mirrors 36 and 38. Brewster angle window 40 separates the filter cell 42 containing molecular oxygen gas of a preselected isotope from the ArF discharge cell 44. By utilizing molecular oxygen gas composed of preselected oxygen nuclides, desired frequencies can be obtained for preferentially photodissociating molecular oxygen gas composed of other preselected oxygen nuclides within irradiation cell 46. This can however, be accomplished more readily by the devices shown in FIGS. 5 and 6.

Figure 5:
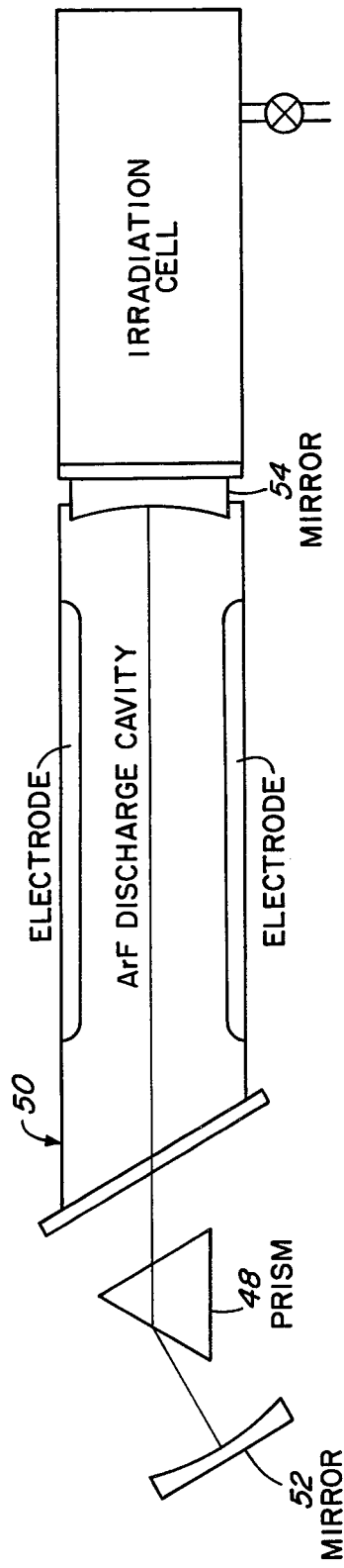
FIG. 5 is a schematic illustration of the preferred embodiment of the invention utilizing a prism to filter the laser output.

As shown in FIG. 5, prism 48 is placed within the lasing cavity the ArF laser formed by mirrors 52 and 54. Prism 48 functions to diffract the laser radiation generated within ArF laser 50 so as to select a very narrow band of frequencies. Laser 50 can then be tuned to a particular absorption band for photodissociation of the desired oxygen isotope to be enriched.

Figure 6:
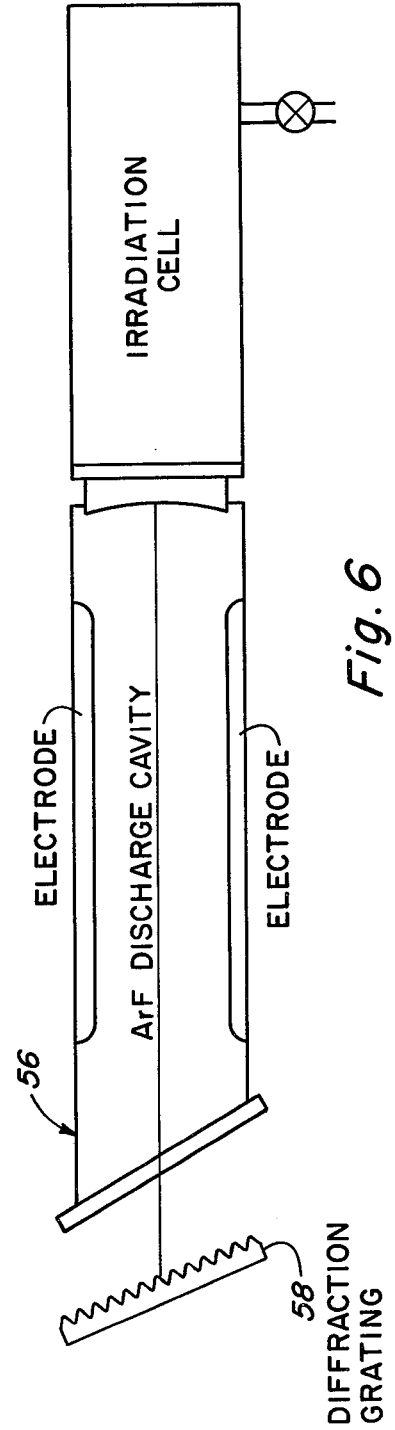
FIG. 6 is a schematic illustration of the preferred embodiment of the invention utilizing a diffraction grating to filter the output of the laser.

FIG. 6 shows a similar device utilizing a diffraction grating for tuning the ArF laser 56 to desired absorption bands.

Both of the devices illustrated in FIGS. 5 and 6 help to eliminate the problem of weak underlying continuum absorption, i.e., the continuum part of the

$$A^3\Sigma_u^+ - X^3\Sigma_g^- \tag{14}$$

transition, which is dissociative and not isotopically selective. Although this cross section is $10^4$ lower at 193 nm than the 4-O Schumann-Runge band integrated absorption, it does occur for the entire lasing line width and can not therefore be considered insignificant. Again, line width narrowing in the devices of FIGS. 5 and 6 significantly reduces the continuum absorption effect.

The present invention therefore provides a device and method for separation oxygen isotopes in oxygen gas in a manner which is inexpensive and easy to accomplish. By employing line narrowing of the laser, photodissociation of particular isotopes of interest can be accomplished. In addition, higher enrichments can be achieved by repetitive photodissociation utilizing scavengers which help to eliminate problems of scrambling and do not degrade the assay.

Obviously many modifications and variations of the present invention are possible in light of the above teachings. For example, any number of recycle steps could be utilized for regenerating enriched oxygen gas to increase purity. Similarly, various scavengers can be utilized within the irradiation cell which do not have absorption bands in the 193 nm wavelength region. It is therefore to be understood that within the scope of the appended claims, the invention may be practiced otherwise than as specifically described herein.

What we claim is:

1. An apparatus for separating oxygen isotopes in oxygen gas, which comprises in combination:
    a. means for producing laser radiation at approximately 193 nm;
    b. means for filtering said laser radiation to produce interaction radiation approximately coincident with dissociative absorption bands of molecules of the oxygen gas containing the oxygen isotope to be separated and preferentially absorbed thereby;
    c. means for directing said interaction radiation into said oxygen gas to preferentially photodissociate said oxygen molecules containing the oxygen isotope to be separated in the oxygen gas thereby producing oxygen atoms enriched in the oxygen isotope to be separated; and
    d. means for allowing a scavenger to interact with said oxygen atoms thereby forming a product separable from the oxygen gas and enriched in the oxygen isotope to be separated, said product being stable with respect to photodissociation by said interaction radiation.

2. The apparatus as described in claim 1, wherein means are provided for separating said oxygen atoms from said product formed from said interaction of said oxygen atoms and said scavenger whereby oxygen gas is generated, said generated oxygen gas being enriched in the oxygen isotope to be separated.

3. The apparatus as described in claim 2, wherein said means for filtering said radiation includes unenriched oxygen gas.

4. The apparatus as described in claim 3, wherein said laser producing means includes an ArF laser.

5. The apparatus as described in claim 2, wherein said means for filtering said radiation includes an intracavity diffraction grating.

6. The apparatus as described in claim 2, wherein said means for filtering said radiation includes an intracavity prism.

7. The apparatus as described in claim 2, wherein said laser producing means includes an ArF laser.

8. The apparatus as described in claim 1, wherein said laser producing means includes an ArF laser.

9. An apparatus for separating oxygen isotopes in oxygen gas, which comprises in combination:
    a. means for generating laser radiation at wavelengths characteristic of an ArF gain medium;
    b. means for tuning said ArF laser radiation to absorption bands of the oxygen gas which are preferentially absorbed by oxygen molecules containing the oxygen isotopes to be separated, said preferential absorption of said laser radiation causing photodissociation of the absorbing oxygen molecules;
    c. means for directing said laser radiation into the oxygen gas;
    d. means for separating atoms produced from said photodissociation of said oxygen molecules from the oxygen gas, said atoms being enriched in the oxygen isotope to be separated; and
    e. means for generating isotopically enriched molecular oxygen gas from sid separated oxygen atoms.

10. A method for separating isotopes of oxygen in oxygen gas, which comprises the steps of:
    a. generating laser radiation at approximately 193 nm;
    b. filtering said laser radiation, to produce interaction radiation approximately coincident with dissociative absorption bands of the oxygen isotope to be separated and preferentially absorbed thereby;
    c. irradiating the oxygen gas with said interaction radiation to preferentially photodissociate oxygen molecules containing the oxygen isotope to be separated in the oxygen gas thereby producing oxygen atoms enriched in te oxygen isotope to be separated; and
    d. combining said oxygen atoms with a scavenger to form a product separable from the oxygen gas and enriched in the oxygen isotope to be separated.

11. The method as described in claim 10, wherein said filtering step includes directing said laser radiation through air.

12. The method as described in claim 10, wherein said filtering step includes diffracting said laser radiation.

13. The method as described in claim 10, wherein said filtering step includes refracting said laser radiation.

14. An apparatus for separating oxygen isotopes in oxygen gas said apparatus producing as product oxygen gas having an enriched oxygen isotopic composition, said apparatus comprising in combination;
   a. means for generating laser radiation to preferentially photodissociate oxygen molecules in gaseous oxygen containing the oxygen isotope to be separated, said laser radiation generating means further comprising:
      i. an optical cavity resonator;
      ii. an ArF discharge cell located inside said optical cavity resonator, said discharge cell providing the lasing medium for said laser radiation generating means; and
      iii. means for tuning said laser radiation to a photodissociative absorption band of the oxygen molecules containing the oxygen isotope to be separated, said laser radiation tuning means being located inside of said optical cavity resonator; and
      iv. means for narrowing the spectral bandwidth of said laser radiation to preferentially photodissociate into oxygen atoms the oxygen molecules in the gaseous oxygen containing the oxygen isotope to be separated, said spectral bandwidth narrowing means being located inside of said optical cavity resonator;
   b. means for directing said laser radiation into the oxygen gas; and
   c. means for collecting said oxygen atoms and generating therefrom molecular oxygen gas enriched in the oxygen isotope to be separated.

15. The apparatus as described in claim 14, wherein said spectral bandwidth narrowing means includes ambient air.

16. The apparatus as described in claim 14, wherein said spectral bandwidth narrowing means includes a prism.

17. The apparatus as described in claim 14, wherein said spectral bandwidth narrowing means includes a diffraction grating.

* * * * *